(12) United States Patent
Saxena et al.

(10) Patent No.: US 11,954,738 B2
(45) Date of Patent: Apr. 9, 2024

(54) SYSTEM AND METHOD FOR MACHINE LEARNING BASED DETECTION, REPORTING AND CORRECTION OF EXCEPTIONS AND VARIANCES IMPACTING FINANCIAL DATA

(71) Applicant: Genpact Luxembourg S.à r.l. II, Luxembourg (LU)

(72) Inventors: Vivek Saxena, Gurgaon (IN); Rajesh Sanghvi, Vadodara (IN); Lavi Sharma, Noida (IN); Garima Kapoor, Noida (IN); Kathryn Stein, New York, NY (US); Atul Kumar, Gurgaon (IN); Vikram Jha, Sealdah (IN)

(73) Assignee: Genpact USA, Inc., New York, NY (US)

( * ) Notice: Subject to any disclaimer, the term of this patent is extended or adjusted under 35 U.S.C. 154(b) by 31 days.

(21) Appl. No.: 17/528,934

(22) Filed: Nov. 17, 2021

(65) Prior Publication Data
US 2023/0153918 A1    May 18, 2023

(51) Int. Cl.
G06Q 40/12        (2023.01)
G06F 18/2431      (2023.01)
G06N 5/04         (2023.01)

(52) U.S. Cl.
CPC ......... *G06Q 40/12* (2013.12); *G06F 18/2431* (2023.01); *G06N 5/04* (2013.01)

(58) Field of Classification Search
None
See application file for complete search history.

(56) References Cited

U.S. PATENT DOCUMENTS

2004/0215546 A1* 10/2004 Nelson ................... G06Q 40/06
                                                   705/36 R
2007/0087756 A1*  4/2007 Hoffberg ................ G06Q 30/08
                                                   455/450

(Continued)

OTHER PUBLICATIONS

Bennett, C., "Flux Capacity—Benefits of Leveraging Oracle ARCS for Variance Reporting", The Hackett Group, (May 18, 2018), 8 pages.

(Continued)

*Primary Examiner* — Fateh M Obaid
(74) *Attorney, Agent, or Firm* — Goodwin Procter LLP

(57) ABSTRACT

A method and system are provided to infer and use machine learning algorithms that is applied to financial data and also to determine: (i) compliance with the applied algorithms, and (ii) whether any exceptions to and/or variations from the algorithms are within an organization's norms. A method includes: receiving financial data; applying a set of dynamic or interdependent algorithms to the received financial data to obtain a set of outcomes; and using a machine learning classifier to classify the outcomes as: (i) algorithm compliant, (ii) potentially algorithm non-compliant, or (iii) algorithm non-compliant. Additionally, the method includes generating controllership persona based actionable triggers, which on acceptance corrects the anomalies in financial data, enabling the method and system to perform as a comprehensive, contextual, consistent & machine learning powered, persona based real time controllership engine leading to reduced misstatements in reported financial data.

16 Claims, 12 Drawing Sheets

(56) References Cited

U.S. PATENT DOCUMENTS

| | | | | |
|---|---|---|---|---|
| 2018/0342324 | A1* | 11/2018 | Cha | C09K 11/70 |
| 2019/0286534 | A1* | 9/2019 | O'Mahony | G06F 21/562 |
| 2020/0151825 | A1* | 5/2020 | Cohen | G06N 5/04 |
| 2020/0294642 | A1* | 9/2020 | Bostic | G16H 50/20 |
| 2020/0387810 | A1* | 12/2020 | Hodgson | G06N 20/00 |
| 2021/0174963 | A1* | 6/2021 | Hill, Jr. | G06N 5/022 |

OTHER PUBLICATIONS

Blackline Systems, "Variance Analysis Module Overview", http://pages.blackline.com/rs/blacklinesystems/images/BlackLine-Variance-Module-Overview.pdf 2 pages, (2021).

Blackline Variance Analysis, Product Overview, https://www.blackline.com/variance-analysis/, 3 pages, (2021).

Blackline, "Blackline Products: Variance Analysis", https://www.blackline.com/assets/docs/uploads/variance_NA.pdf, 2 pages, (2020).

FLoQast, "FLoQast Flux", (Sep. 2020), https://floqast.com/products/floqast-flux/, 2 pages, (2021).

* cited by examiner

250a

| Applicable | BS/PL | L2 | L3 | L4 | Type of rule |
|---|---|---|---|---|---|
| Yes | BS | Assets Held For Sale | Assets Held For Sale | Assets held for sale - other non-current | Balances at group |
| Yes | BS | Cash & Cash Equivalent | Cash | Balances in pooling banks | Balances at GL |
| Yes | BS | Cash & Cash Equivalent | Cash | Bank clearing accounts | Balances at GL |
| Yes | BS | Cash & Cash Equivalent | Cash Equivalents | Revaluation - cash equivalents | Causal relationship |
| Yes | BS | Deferred Tax Assets | Deferred Tax Assets | Deferred Tax Assets | Causal relationship |
| Yes | BS | Financing Receivables | Lease Receivables | Provision against lease receivables | Causal relationship |
| Yes | BS | Intangible Assets, net | Intangible Assets - Gross | Assets under construction - intangibles | Sub-ledger balances |
| Yes | BS | Inventories | Finished Product | Finished product - non IC | Causal relationship |
| Yes | BS | Net Property, Plant & Equipment | Less Accumulated Depreciation & Amortization | Less Accumulated Depreciation & Amortization | Balances at group |
| Yes | BS | Net Property, Plant & Equipment | Less Accumulated Depreciation & Amortization | Less Accumulated Depreciation & Amortization | Sub-ledger balances |
| Yes | BS | Net Property, Plant & Equipment | Property Plant & Equipments | Assets under construction | Sub-ledger balances |
| Yes | BS | Other Prepaid and Receivable | Other Prepaid and Receivable | Other suspense / clearing accounts | Balance at GL |
| Yes | BS | Other Prepaid and Receivable | Other Prepaid and Receivable | Other suspense / clearing accounts | Balance at GL |
| Yes | BS | Others | Others | Asset retirement obligation, non-current | Balances at group |
| Yes | BS | Short Term Borrowings | Current portion of non-current borrowings | Bonds | Balances at GL |

FIG. 2C

| Rule text | Threshold applicable | Transaction code source |
|---|---|---|
| Variance in account greater than specified threshold | Yes | KE5A |
| Balance in the account <>0 | Yes | KE5A |
| Same balance in GL for 2 months i.e. current month = previous month | Yes | KE5A |
| Change in account matching the movement in PL for revaluation of cash equivalents | Yes | KE5A |
| Movement in account compared to PL | Yes | KE5A |
| Change in account matching the movement in PL for allowances of doubtful debts | Yes | KE5A |
| No movement in WBS balances / individual assets within account for 2 months | Yes | KE5A |
| Balance of group for Finished product - non IC and Finished product - IC to % of sales variance more than a specified % eg. 12% in previous month and 14% in current month with a threshold of 1% for identification | Yes | MB5L and KE5A |
| Variance in depreciation cost > specified threshld compared to previous month | Yes | KE5A |
| Matching of sub-ledger balances by group to GL accounts within group | Yes | KE5A |
| No movement in WBS balances / individual assets within account for 2 months | Yes | S_ALR_87013558 and KE5A |
| Balance in account <>0 | Yes | KE5A |
| Balance <>0 | Yes | KE5A |
| No movement in account for 2 months | Yes | KE5A |
| No movement in account for 2 months | Yes | KE5A |

| Applicable | BS/PL | L2 | L3 | L4 | Type of rule |
|---|---|---|---|---|---|
| Yes | BS | Short Term Borrowings | Current portion of non-current borrowings | Bonds | Balances at group |
| Yes | BS | Short Term Borrowings | Current portion of non-current borrowings | Bonds | Balances at group |
| Yes | BS | Short Term Borrowings | Current portion of non-current borrowings | | Balances at GL |
| Yes | BS | Short Term Borrowings | Current portion of non-current borrowings | Credit lines | Balances at group |
| Yes | BS | Short Term Borrowings | Current portion of non-current borrowings | Credit lines | Balances at group |
| Yes | BS | Short Term Borrowings | Short Term Borrowings | Commercial paper | Balances at group |
| Yes | BS | Short Term Borrowings | Short Term Borrowings | Other credit lines | Balances at group |
| Yes | BS | Short Term Borrowings | Short Term Borrowings | Short term revolving / other credit lines | Balances at group |
| Yes | BS | Trade receivables/Debtors | Accounts receivables/ Trade receivables/ Debtors | Allowances for doubtful debs - non IC - fixed provision | Causal relationship |
| Yes | BS | Trade receivables/Debtors | Accounts receivables/ Trade receivables/ Debtors | Non-trade AR - IC | Sub-ledger balances |
| Yes | BS | Trade receivables/Debtors | Accounts receivables/ Trade receivables/ Debtors | Trade AR - IC | Sub-ledger balances |
| Yes | BS | Trade receivables/Debtors | Accounts receivables/ Trade receivables/ Debtors | Trade AR - non IC | Balances at group |
| Yes | BS | Trade receivables/Debtors | Accounts receivables/ Trade receivables/ Debtors | Trade AR - non IC | Balances at group |
| Yes | PL | Depreciation and Amortization | Amortization of Intangibles | Amortization of Intangibles | Causal relationship |
| Yes | PL | Other accrued liabilities | Other accrued liabilities | Accrued interest expense | Causal relationship |
| Yes | PL | Selling, General and Administrative Expenses | General and Administrative Expenses | Provision for Doubtful Debts | Causal relationship |

FIG. 2D

| Rule text | Threshold applicable | Transaction code source |
|---|---|---|
| Interest expense on bonds / (Bonds, current and non-current)% variance compared to previous month > 0.1% or other specified threshold | Yes | KE5A |
| No movement in account for 2 months | Yes | KE5A |
| No movement in account for 2 months | Yes | KE5A |
| Interest expense on Credit lines / (Credit lines, current and non current portion)% variance compared to previous month > 0.1% or other specified threshold | Yes | KE5A |
| No movement in account for 2 months | Yes | KE5A |
| Interest expense on commercial paper / (Commercial Paper)% variance compared to previous month > 0.1% or other specified threshold | Yes | KE5A |
| Interest expense on short term loan / (Short term revolving / other credit lines)% variance compared to previous month > 0.1% or other specified threshold | Yes | KE5A |
| Interest expense on short term loan / (Short term revolving / other credit lines)% variance compared to previous month > 0.1% or other specified threshold | Yes | KE5A |
| Change in account matching the movement in PL for allowances of doubtful debts | Yes | KE5A |
| Balance in individual account in sub-ledger same for the current month and previous month | Yes | S_ALR_87012082 |
| Balance in individual account in sub-ledger same for the current month and previous month | Yes | S_ALR_87012082 |
| Balance of group for Trade AR - non IC, Trade AR - IC, Non-trade AR - non IC and Non-trade AR - IC to % of sales greater than a threshold | Yes | S_ALR_87012082 |
| Balance of group for Trade AR - non IC, Trade AR - IC, Non-trade AR - non IC and Non-trade AR - IC to % of sales variance more than a specified % eg. 12% in previous month and 14% in current month with a threshold of 1% for identification | Yes | S_ALR_87012082 |
| (Total of Depreciation of Amortization of Intangibles) / (Total of Intanible assets). High variation in % values amongst 2 months beyond a specified threshold | Yes | KE5A |
| Accrued interest expense / (Total of Interest expense). High variation in % values amongst 2 months beyond a specified threshold | Yes | KE5A |
| (Total of Depreciation of Amortization of Intangibles) / (Total of Intangible assets). High variation in % values amongst 2 months beyond a specified threshold | Yes | KE5A |

FIG. 2D (Cont.)

| L1 Category | Total Rules # | Causal Relationship | Actual vs Budget | Periodic Movements | Key Ratios | Causal Relationship | Actual vs Budget | Periodic Movements | Key Ratios |
|---|---|---|---|---|---|---|---|---|---|
| Total Assets | 161 | 100 | 30 | 7 | 24 | 18/6/76 | 12/2/16 | 4/2/4/1 | 4/8/12 |
| Total Liabilities | 105 | 20 | 23 | 10 | 52 | 12/6/56 | 12/6/56 | 12/6/56 | 12/6/56 |
| Total Income | 19 | 200 | 30 | 7 | 70 | 12/6/56 | 12/6/56 | 12/6/56 | 12/6/56 |
| Total Expenses | 235 | 100 | 30 | 47 | 58 | 12/6/56 | 12/6/56 | 12/6/56 | 12/6/56 |

Legend: # of VALIDATIONS PASSED | # of RESULTS NEED TO CHECK | # of VALIDATIONS FAILED 302, 304, 306, 312, 314, 316

FIG. 3A

Of VALIDATIONS FAILED — 402 — 2/21

Save

| S No. | Rule Type ▽ | GL Account ▽ | Rule Name | Rule ID ▽ | Validations Failure Message ▽ | Status ▽ | 404 Action |
|---|---|---|---|---|---|---|---|
| 1 | Sign Color | Impairments-000234 | All expenses should be Debit / "+ve" | CR 0034 | Impairments balance is "-ve"/ Credit | Open | MJE to be passed to correct the sign color |
| 2 | Period | Rent / Leases-000299 | Rent per contract to be booked for all / part of the year | CR 0101 | Rent booked for 11 months only | Open | Accrual entry not booked yet - to be posted |

Potential P&L Impact (Before Tax) for validations in "fail" status : USD 513k

FIG. 4A

| Category | Current Quarter | | | Prior Quarter | Validations | | | User Comments |
|---|---|---|---|---|---|---|---|---|
| | Oct-2018 | Sep-2018 | V | June-2018 | Message | Status | Ignore | |
| Current Liabilities > Accrual | | | | | | | | |
| Payroll | 575 | 233 | 250 | 342 | Variance greater than 20% | CHECK | ☐ | |
| | | | | | Non-reversal of opening accruals in account 1070.21-Salesman bonus | FAIL | ☐ | |
| Services - Purchase order | 250 | 189 | 193 | 61 | Accruals 20% higher than previous quarter average | CHECK | ☑ | Lawyer fees accrual of $63,000 - workers compensation |
| Rent and utilities | 77 | 75 | 76 | 2 | Expense variance greater than 10% v. previous quarter average | FAIL | ☑ | Termination of Harbor Bay Lease |
| Professional services | 123 | 125 | 117 | -2 | Un-cleared line items > 90 days | CHECK | ☐ | |
| | | | | | Variance greater than 40% in account 10400.76251 - Office supplies | FAIL | ☑ | Ignored for current close |

SYSTEM AND METHOD FOR MACHINE LEARNING BASED DETECTION, REPORTING AND CORRECTION OF EXCEPTIONS AND VARIANCES IMPACTING FINANCIAL DATA

FIELD

This disclosure generally relates to machine learning (ML) techniques and, in particular, to training and use of ML modules to detect latent patterns in financial data, to derive algorithms from such patterns for analyzing the data, and further to analyze the application of the algorithms, including exceptions and variances therein, that may be validated using ML.

BACKGROUND

A typical organization's finances are generally controlled by dozens, if not hundreds of algorithms and guiding principles. In general, the algorithms and guiding principles are not always well-defined, unchanging, or static entities. Rather, many algorithms are interdependent, may depend on factors outside of the organizations control, and can change dynamically. As such, the task of ensuring compliance with such algorithms, typically performed by a controller, can be time consuming and/or may is often error prone.

SUMMARY

Methods and systems are disclosed in which machine learning may be employed to derive algorithms to be applied for analysis of financial data and/or to determine whether any exceptions to the algorithms or variances in the application of the algorithms falls within the organizations norms. This analysis, which can be computationally prohibitive using conventional programming, can be performed efficiently, by reducing the usage of computing resources and within a specified constraint on processing and/or memory resources. It is a method for detection, reporting and remediation of anomalies/exceptions/variations in financial data under controllership review, the method comprising of receiving controllership data (including but not limited to financial, non-financial, unstructured, internal, external etc. henceforth referred to as "controllership data") and applying a set of dynamic and interdependent algorithms to the received controllership data to obtain a set of outcomes, and using a machine learning (ML) classifier to classify the outcomes as: (i) algorithm compliant, (ii) potentially algorithm non-compliant, or (iii) algorithm non-compliant, wherein the classifier is trained to perform such classification by simultaneously analyzing a plurality of outcomes resulting from application of a plurality of dynamic or interdependent algorithms from the set to controllership data, and classification of the outcomes as potentially algorithm non-compliant, and (iii) algorithm non-compliant indicates a latent anomaly in the received controllership data. These dynamic and interdependent algorithms are derived through ML applied to the labeled controllership data repository based on a difference between an actual value of an item associated with the data and a budgeted value for that item, or a temporal property of the received data or factorial relationship of two items within the data or a causal relationship between two items within the data, wherein the ML module is trained to detect periodic movement in the data, a key factorial relationships from the data, or a causal relationships between items of data including mimicking actions of a particular user.

According to one embodiment, a method includes: receiving financial data, and applying a set of dynamic or interdependent algorithms to the received financial data to obtain a set of outcomes. Additionally, the method includes using a machine learning (ML) classifier to classify the outcomes as: (i) algorithm compliant, (ii) potentially algorithm non-compliant, or (iii) algorithm non-compliant. The classifier is trained to perform such classification by simultaneously analyzing a number of outcomes resulting from the application of a number of dynamic or interdependent algorithms from the set to financial data. The classification of the outcomes as potentially algorithm non-compliant or as determined to be algorithm non-compliant indicates a latent anomaly in the received financial data. The classifier is customized to perform the classification to mimic actions of a particular user, rendering persona driven actionable triggers, which on acceptance corrects the latent anomalies in financial data.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings:

FIGS. 2C and 2D show example training datasets, according to one embodiment;

FIGS. 3A and 3B depict dashboards presenting the results of the analysis performed by certain embodiments of the system shown in FIG. 1, according to some embodiments;

FIGS. 4A and 4B depict example dashboards presenting additional results of the analysis performed by certain embodiments of the system shown in FIG. 1, according to various embodiments.

DETAILED DESCRIPTION

Figure 1:
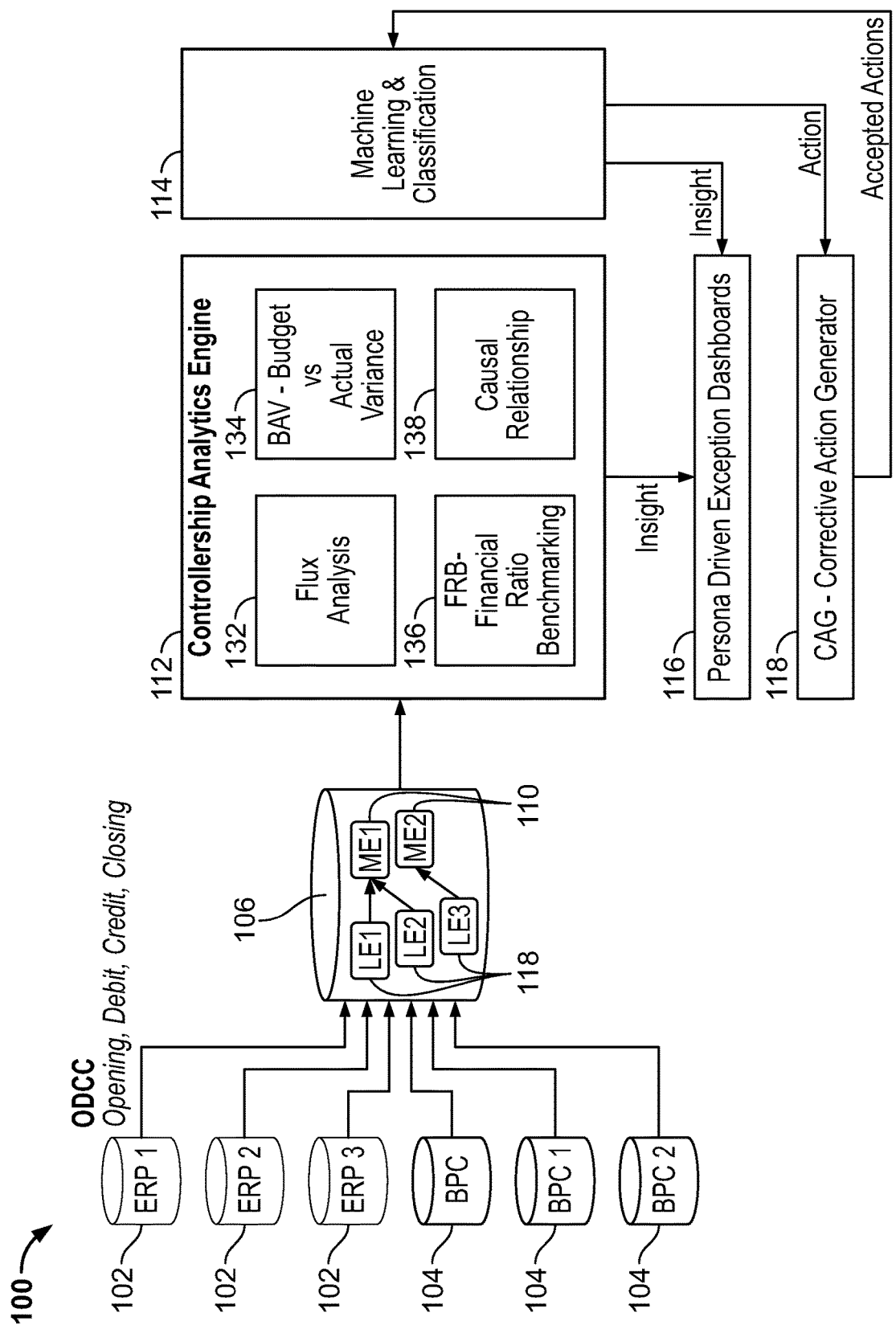
FIG. 1 is a block diagram of a algorithm generation and exceptions and variance analysis system, according to various embodiments.

The following disclosure provides different embodiments, or examples, for implementing different features of the subject matter. Specific examples of components and arrangements are described below to simplify the present disclosure. These are merely examples and are not intended to be limiting.

A typical organization's finances are generally controlled by dozens, if not hundreds of algorithms and guiding principles. For example, a division within an organization may have a budget for hiring new employees, may have a requirement to perform certain capital expenditures only within a particular time frame, so as to obtain a tax benefit, may have an advertising budget that is tied to a competitors advertisement spending, etc. In addition, the algorithms and/or the parameters of the algorithms may depend on factors outside of the organization's or a particular division's control, such as interest rates, demand for organizations services and products, cost of raw materials, etc.

In general, the algorithms and guiding principles are not always well-defined, unchanging or static entities. Rather, many algorithms are interdependent, may depend on factors outside of the organizations control, and can change dynamically. To make matters more complicated, many of these algorithms are not absolute; they allow for exceptions and variances, and the parameters of the exceptions and variances, such as when a particular exception is to be allowed or not allowed, the size of a variation to be allowed, etc., often change dynamically, as well.

In an organization, it is typically the responsibility of a financial controller (also referred to as a controller) to ensure that the organizations specified financial algorithms and guiding principles are generally followed. The controllers are also responsible to ensure that the exceptions to the algorithms and/or allowed variances in application of the algorithms is consistent and explainable.

Finance controllers in many industries are generally required to analyze financial data for any variations and exceptions, which are required to be understood and explained. In performing this task, controllers often struggle with mechanism and methodology of reviewing financial records and numbers. One particular obstacle to this task is that hereto before, there has been no known solution that identifies exceptions and variances (collectively referred to as exceptions) for the controllers so that they can review and analyze such exceptions. In the end, financial controllers often end up reviewing large quantities of financial data, often at the month end, which consumes significant time (hours, days, even weeks) to complete the required analysis. Additionally, this analysis is highly error prone, leading to exactly the kind of errors that are to be avoided, e.g., inconsistent (outside of norms) and/or unexplainable application of specified financial algorithms and/or exceptions.

Moreover, every controller usually has his/her/their own way of reviewing numbers, performing correlations between multiple variables, e.g., sales and debtors, templates and parameters for assessment, etc. Also this individualized manner of reviewing numbers can be unique to legal entity/country/region/organization/industry. The numbers may be reviewed at balance level and in some cases at a transaction level, which often does not provide a view or insight on probable exceptions, patterns, trends that might impact financial reporting. For these reasons, as well, the determination that the specified financial algorithms and guiding principles are followed, and that the exceptions are within norms and/or explainable can be inconsistent and unreliable.

Controllers can often spend very little time actually analyzing the financial numbers due to several issues, addressing which takes controllers time, including but not limited to the following: (a) Reliability of data: Inconsistency and variation due to multiple sources of data and manual adjustments that may need to be performed before analyzing the numbers; (b) Manual preprocessing: Such data collation and consolidation precedes analysis and root cause analysis, and is typically manual and time consuming. Manual efforts may also be required to create multi-dimensional view for sophisticated analysis and to gain insight into the numbers; (c) Large number of exceptions and variations: The number of exceptions and/or variations which requires attention of controllers can be too numerous to be analyzed thoroughly under a time constraints; and (d) Multiple stages of reviews: Pre close of a financial statement, during close, and post close, each may require a robust review.

Some additional issues may include: (e) Lack of availability of a single reporting/analysis tool: This often results in a limited view on the actual issues pertaining to the application of the specified algorithms and their exceptions. Such actual issues are usually latent. (f) Non standardized format of received information: Data may be supplied in geography specific, division specific, and/or reporter specific manner, which can make the analysis of how the specified financial algorithms and any exceptions were applied harder; (g) Requests from different stake holders: Different requestors, such as upper management, product/service specific management, regulators, etc. may be concerned with different aspects of the overall application of the specified financial algorithms. For example, a sales team may focus on insights into market and products related patters in the application of the specified financial algorithms and exceptions, while a plant/supply chain team may focus on insights in the application of the specified financial algorithms and exceptions as they relate to cost elements such as raw materials, plant costs, inventories, etc; and (h) Long time required for response to specific queries delaying, the overall analysis.

The challenges in addressing one or more of these issues is that the determination of whether the specified financial algorithms were applied in a consistent manner, and whether any exceptions and/or variations were also applied in consistent and explainable (e.g., justifiable) manner can be inconsistent and error prone. This can pose controllership risks that can ultimately impact an organizations compliance requirements, and can result in penalties due to any errors/misrepresentation in financial statements.

Some products used for enterprise resource planning (ERP) may provide consolidated financial information. However, these products generally do not provide insights into the exceptions, correlations therebetween, or a systematic analysis of the application of algorithms and exceptions that financial controllers often need the most. Some techniques and products offer limited capabilities to perform variance analysis that can help the financial controllers in analyzing financial data. These applications typically focus on preset relationships, e.g., impact of capital expenditure on cashflow, relation between assets capitalization and depreciation, etc. They do not provide insights into whether the specified financial algorithms were applied in a consistent manner, and whether any exceptions and/or variations were also applied in consistent and explainable (e.g., justifiable) manner.

One may think that a programmatic solution, such as a computer running a software program, can address the above-identified issues. It is the dynamic, interdependent nature of the algorithms, and the dynamic nature of the exceptions and allowed variances that presents a significant challenge to a programmatic solution. In particular, the number of different versions of the specified algorithms taking into account various applicable parameters, and the applicable combinations of interdependent algorithms can grow exponentially. Furthermore, there can be an exponentially increasing numbers of exceptions and variances that may apply to the applicable algorithms that are derived from the specified algorithms. As such, a programmatic solution exploring all the different applicable algorithms and exceptions would have to consider a total number of alternatives that can increase exponentially. As such, a computer used to implement the programmatic solution can take excessively long (e.g., days), may require more than allocated processing capacity and/or time, and/or may run out of available memory. Techniques described below can avoid these problems using machine learning.

FIG. 1 is block diagram of an overall evaluation system 100 that employs a controllership review engine discussed further below. The evaluation system 100 receives financial data from various ERP resources 102 and business planning and consolidation (BPC) resources 104. The financial data typically includes opening, debit, credit, and closing (ODCC) data. This data, consolidated in a database 106, may include transactions-level data, legal entity-level data 108 for one or more legal entities, and/or management entity-level data 110 for one or more management-level entities, such as divisions or subdivisions within an organization. Different divisions or subdivisions may be associated with different products, services, geographies, etc.

The financial data is received by the controllership review engine 112 (which may be referred to as the engine 112). The engine 112 analyzes the data in four dimensions, namely, causal relationships, key ratios, periodic movements, and variations with respect to budgets. In the embodiment shown in FIG. 1, periodic movement analysis is performed in the flux analysis module 132. Variations with respect to budgets are analyzed in the BAV (Budgets vs Actuals Variance) module 134, key ratios analysis is performed in the FRB (Financial Ratio Benchmarking) module 136, and causal relationship analysis is performed in the causal relationship module 138. In different embodiments, different the analysis may be distributed across fewer modules, where one module may perform two or more different types of analyses. More than four modules, where two modules perform the same type of analysis, either in duplicate, or on different portions of input data, may also be provided.

The end to end process of the engine 112 according to various embodiments is a multi-step process. At a high level and as noted above, there are four dimensions to the process which includes algorithm based and patterns based causal relationships, key ratios, periodic movements, variations with respect to budgets (specified limits). Variation with respect to a budget, performed in the module 134 in the engine 112, is typically straightforward, though exceptions and the corresponding variations, e.g., frequency at which a specified budget is exceeded, the amounts by which the budget is exceeded, etc., are among the types of insights the controllership review engine can provided in various embodiments. Causal relationships, key ratios, and periodic movements are further discussed below.

In the system 100, the overall process starts with creating profiles for the legal entities including information such as the company code, legal entity code, chart of accounts code, ERP, location, personas of the controllers to whom access will be provided, etc. Once the profile is created, the next step is to access data from ERP tools 102 and consolidation tools 104 using an integration engine that may provide consolidated data in the database 106. This data is processed using certain algorithms (implemented as subprocesses) provided to: (i) infer, in module 138, causal relationships between accounts, (ii) create formulas for key ratios in module 136, and (iii) generate in module 132 formulas to showcase period-to-period movements including, but not limited to, year-to-year, quarter-to-quarter, month-to-month, etc. Movements from one quarter relative to the same quarter in the previous year, year-to-date movements, etc. may also be identified.

Inferencing of causal relationships, e.g., between purchases, credits, and cost of goods sold (COGS); sales, inventory, and receivables; advertising spends, sales, and revenue; sales, trade spends, and distributor claims, etc. can provide single view of all the business transactions impacting one or more balance sheet (BS) elements. Causal inferencing generally includes defining causal relationships between two accounts where algorithms are defined for validation checks and reporting. Causal inference may allow the engine 112 to define causal relationships based on patterns and strong correlations.

Patterns based exception identification can showcase policy exceptions or transactions beyond policy control limits. Identification of transactions volatility can identify any abnormality. Different embodiments of the engine 112 can be customized according to user needs, e.g., to identifying certain key account codes for which the causal relationships needs to be built. In some embodiments, causal relationships are continually inferred on an on-going bases and, in some cases, recommendation for a potential causal relationship may be given for human evaluation. In some embodiments, pre-specified causal relationship definition(s) are provided at account level, and these relationships can further be mapped to client specific chart of account codes. In some embodiments, machine learning is employed in the engine 112 to discover latent patterns that can identify causal relationships that have not yet been defined.

As further discussed with reference to FIGS. 3A and 3B, based on the financial data collected, an embodiment of the engine 112 can perform validation checks based on the specified and/or inferred causal relationships. As part of the validation checks, the engine 112 can determine and provide as an output result, for each specified and/or inferred causal relationship, whether the data exceed or fail to meet one or more thresholds for the parameters defining the relationship. The output of validation checks based on causal relationships may be reviewed for any variations/out of the range output and corresponding action by the controller. The user interface may show the dashboards with outcomes of validation checks and status post action taken in response to the validation checks.

Various embodiments of the engine 112 determine key financial statement ratios such as, e.g., working capital, liquidity ratio, inventory turn, debtors turn, etc., which are auto calculated based on financial data. The process starts with defining the ratios to be measured as the corresponding formulas, and mapping the accounts to the applicable formulas for calculating the applicable ratios. These ratios may be defined along with the corresponding mapping algorithms for any new chart of account. Additional ratios may be auto defined based on patterns identified via machine-learning, where the patterns may identify strong correlation between a pair of dimensions, e.g., leased assets to revenue.

The engine 112 may be configures according to user requirements, e.g., to map certain specified account codes to the right formula used to evaluate a specified key ratio. In some embodiments, the calculations of certain key ratios are performed continually, and the ratios are updated as needed.

In addition, based on the collected financial data, the engine 112 may perform validation checks with respect to the specified and/or identified key ratios. As discussed below with reference to FIGS. 3A and 3B, the output of the validation checks for the key ratios is presented in a user interface dashboard, where these results may be reviewed for accuracy and/or explained by a controller. In some embodiments, a machine learning model is applied to the financial data to predict the ratios for a future period, e.g., the next (or a later) month, quarter, year, etc. These predicted results can help improve the accuracy of the ML-based engine, and in predicting the ratios well.

Periodic movements indicate the variance between periods, e.g., a month vs a previous month; a month vs the same month from a past year; year-to-date vs year-to-date in a past year; a quarter vs a previous quarter; a quarter vs the same quarter from a past year; year-to-year, etc. These variances can identify any exceptions to the policies represented by the specified financial algorithms, variation in correlations, movements, e.g., due to new algorithm, policy, statutory requirement, socio-political event, etc. Periodic movement analysis generally starts with extracting the account balance from the ERP. This data is mapped to the account groups/nature for calculating variations at a legal entity level, account level, country level, regional level, business level, etc. The mapping algorithms may be defined along with mapping algorithms for any new chart of account addition.

The mapping can be configured according to user needs, e.g., to map the account codes to the right formula(s) for periodic movements of interest. Once the mapping is provided, the engine 112 may continually compare the data from the specified periods to detect any movement. Patterns of such movement can identify the variations at the profit center level or at the cost center level based on certain specified parameters, e.g., strength of variation between two cost centers or profit centers, confidence level of the variation at an account level, etc. The engine 112 may also detect movements at the transactions level (which are beyond control limits), e.g., certain accounts having high variance in one period (usually a later period) compared to another period, the number of transactions exceeding a traditional specified threshold in one period compared to another period.

Based on the data collected, the engine 112 performs the specified validation checks. As discussed below with reference to FIGS. 3A and 3B, the output of the validation checks for the periodic movements is presented in a user interface dashboard, where these results may be reviewed for accuracy and/or explained by a controller. In some embodiments, a machine learning model is applied to the financial data to predict movements for a future period, e.g., the next (or a later) month, quarter, year, etc. These predicted results can help improve the accuracy of the ML-based engine, and in predicting the movements well. Finding patterns (trends) based on the historic data about market cycle, pricing movement, etc., may be the tasks a controller may be asked to perform. The periodic movement information detected by the engine 112 can assist with this task.

The variations in one or more of the four dimensions of analysis (causal relationships, key ratios, periodic movements, and variations with respect to budgets), as reported based on the validation checks may be reviewed by a controller who may require corrections, changes, and may provide explanation of variations. The thresholds defined for the variations to be considered valid or outside of the norm may be explained by the controller. For any variations beyond a specified range that are detected as part of the validation checks by the engine 112, a controller may be required to explain such variations.

The engine 112 applies in the module 132 the derived periodic movement formulas to the financial data, to identify exceptions and/or variances. The module 134 applies the specified budget-to-actual algorithms to the financial data; the module 136 applies the derived key ratio formulas to the financial data; and the module 138 applies the inferred causal relationships algorithms to the financial data. As in the module 132, exceptions and/or variances in the application of these inferred algorithms and derived or specified formulas are detected.

In the respective modules, the respective exceptions and/or variances are analyzed further, and classified as described below, using respective machine learning models provided by the machine learning and classification subsystem 114. To this end, each of the modules 132-138 may be configured as a machine-learning system such as, e.g., an artificial neural network (ANN), a Bayesian analysis module, a decision tree, a random forest, and/or a machine-learning-based regression module. In some embodiments, one or more additional modules, configured as machine-learning-based classifiers may be provided to perform the classification described below.

For the sake of convenience, the discussion below refers to modules applying the machine learning models as classifiers. A classifier classifies the exceptions and variances into three classes, namely, the exception/variation is within the norms of the organization and/or a particular controller; the exception/variation is outside of the norms; or the exception/variation is likely outside of the norms, warranting a human review. Such classification may be performed across all four dimensions—causal relations, key ratios, periodic movements, and budge vs actual variations. In this classification, the respective machine learning models are trained (as discussed below) to mimic the organization's past practices. The models may be customized according to the style (also called persona) of an individual controller. The results of the classification are presented in a hierarchical manner in the dashboard 116.

In some cases, human controller(s) may review the results of the classification and perform a corrective action via the corrective action generator (CAG) module 118. For example, an exception/variation classified as likely outside the norms may be reclassified as either within the norms or outside the norms. This information, provided by the CAG module 118 may be supplied to the machine learning subsystem 114 to update the machine learning models, so that subsequent classification of similar exception(s)/variation(s) occurring in the future may be performed accurately.

Figure 2A:
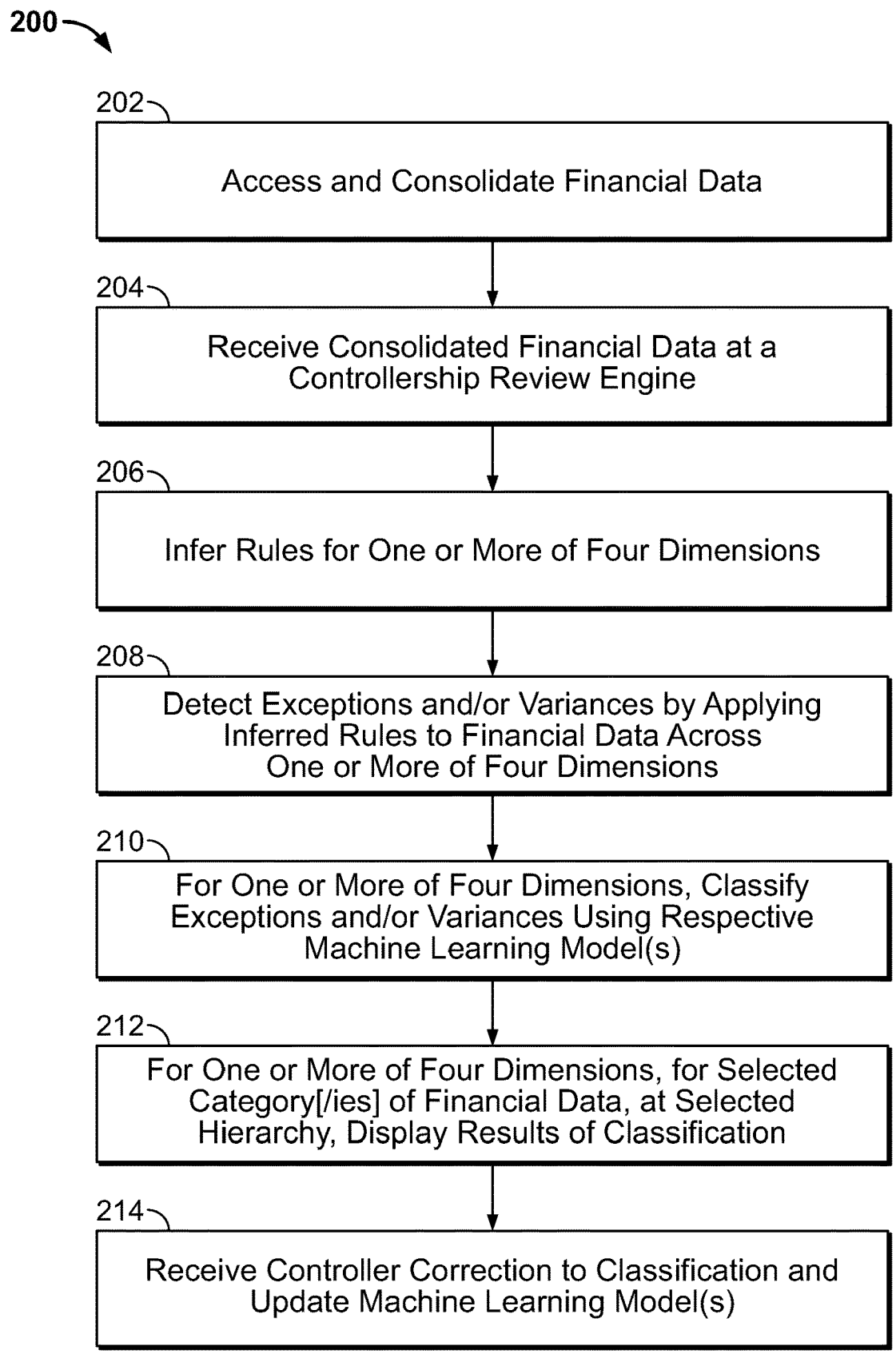
FIGS. 2A and 2B are flow charts demonstrating the operations performed in certain embodiments of the system shown in FIG. 1, according to various embodiments.
Figure 2B:
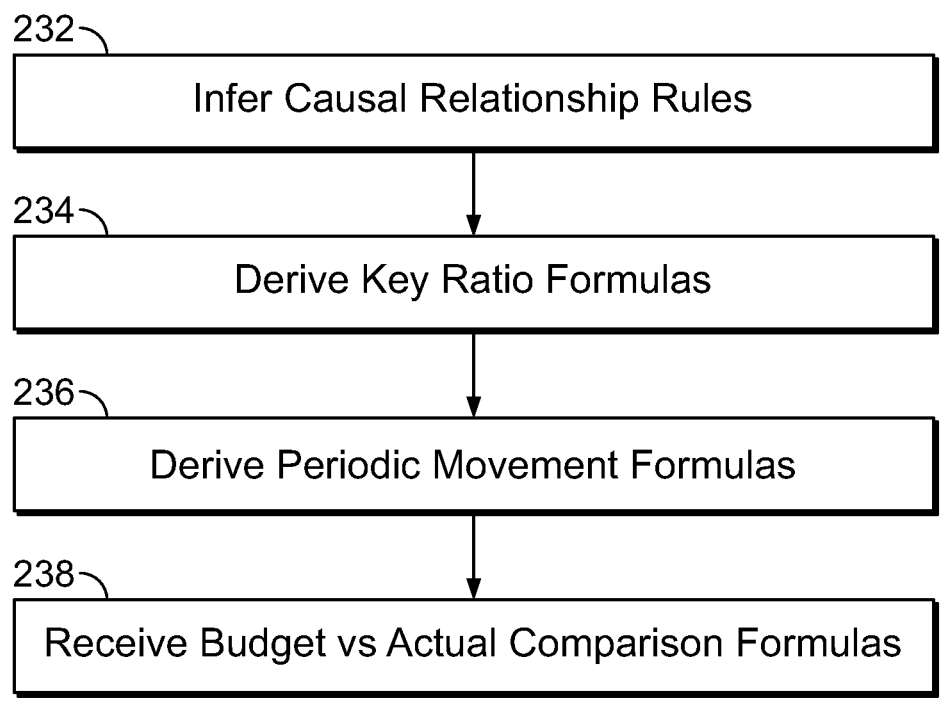

FIG. 2A is a flow chart depicting the overall analysis process 200 performed by the system 100 (FIG. 1), according to various embodiments. Financial data from various ERP (Enterprise Resource Planning) and BPC (Business Planning and Consolidation) sources is accessed and consolidated in step 202. The system 100, in particular the engine 112 (FIG. 1), receives the consolidated data at step 204. Algorithms across one or more of the four dimensions described above are inferred or derived in step 206. With reference to FIG. 2B, causal relationship related algorithms are inferred in step 232. Key ratio formulas are derived in step 234. Periodic movement formulas are derived in step 236, and budget vs. actual comparison formulas may be received in step 238. The steps 232-238 do not depend on each other and may be performed sequentially, in any order, in parallel, or sequentially in part and in parallel in part.

Referring again to FIG. 2A, the inferred or derived algorithms are applied to the financial data in step 208, in order to detect exceptions and/or variations in the application of the algorithms. This and subsequent steps may be performed for all four dimensions of analysis or only one, two, or three dimensions. In step 210, the detected exceptions/variances are classified into three categories, namely, the exception/variation is within the norms of the organization and/or a particular controller; the exception/variation is outside of the norms; or the exception/variation is likely outside of the norms, warranting a human review.

In step 212, the classifications are displayed for one or more selected categories of financial data such as assets, liabilities, income, expenses, etc. The algorithms inferred/derived in step 206 are hierarchical in nature, as described below. Accordingly, the classification performed in step 210 is also hierarchical. Likewise, the displaying of the classification is also hierarchical. Upon review of the classification, a controller may take corrective action, by reclassifying a particular class designation. This information may be provided to the machine learning subsystem 114 (FIG. 1) to update the machine learning models to be used in subsequent classifications in step 214.

The algorithms are inferred/derived in step 206 at four levels. Using the category of assets as an example, at level L1, the algorithms are provided for total assets. The algorithms at level L2 are provided for the subcategories current assets, and property plant and equipment (PPE). At level L3, the algorithms are provided for sub-subcategories within the subcategory of current assets, namely, for cash and cash equivalents, trade receivables, inventories, loans and advances, prepaids, other current assets. At level L4, the algorithm are provided for sub-sub-subcategories within the sub-subcategory of inventory, namely, raw materials, finished goods, work in progress material, etc.

Algorithms are similarly derived for sub-categories, sub-subcategories, and sub-sub-sub-categories of each of the other categories, namely, liabilities, income, and expenses. It should be understood that the example provided above is illustrative and not limiting. In general, an organization may define the categories, sub-categories, sub-subcategories, and sub-sub-subcategories of its financial data in any manner it should choose.

Examples of causal relationships and/or correlations that may be inferred according to the analysis process 200 are provided below. It should be understood that these examples are illustrative only and are not limiting.

Causal relationships: For inventory values rising on a per unit basis by more than ±2% compared to previous observation period, the increase may be validated against the standard price list for key materials, e.g. for a confectionary company, the price of flour. A concern may be raised for manual resolution if there is a more than +2% variation between a change in the price of flour and a change in the valuation of finished goods. To illustrate, if the price of flour increases by 6%, a concern may be raised if the per-unit valuation of finished goods increases by more than 8%. No concern may be raised if the increase in the per-unit valuation of finished goods was within 2% of the 6% increase in the price of the flour, e.g., in the range greater than 4% and less than 8%.

As another example, for certain key months of the year (e.g., the summer months, or April through August) the electricity consumption for one month (e.g., April) may vary substantially compared to a previous month, generally due to a change in the weather. Thereafter, as a new season settles, the variation in the subsequent months may be smaller. As such, a causal relationship algorithm may allow ±20% variance in a first month of a new season compared to the last month of the previous season. Only a ±2% variance may be permitted across months of the same season.

When comparing the electricity consumption across a particular month (time period, in general) in one year (an encompassing time period, such as a quarter, a two-year window, etc.) and the same month (time period) from the immediately preceding or earlier years (encompassing time periods), a variation in the range ±2% may be allowed. For variances compared with respect to previous time period or the same time period from an earlier encompassing time period, if the variance is greater than ±2%, the number of active days in the time period may be taken into account, and the electricity consumption may be adjusted accordingly. If the variance of cost per day is greater than ±2% a flag for manual resolution may be raised.

Correlations: A correlation may exist between the directional movements for revenue and sales commission. For example, the percentage change of sales vis-à-vis previous month and previous year same period may be recorded. The percentage change of sales commission vis-à-vis previous month and previous year same period may also be recorded. If the variance is positive in both cases or negative in both cases, then these variations may appropriate. Otherwise, a concern for manual resolution may be raised.

As another example, a correlation may exist between the directional movements for inventory and sales. The percentage change of sales vis-à-vis previous month and previous year same period may be recorded. The percentage change of inventory vis-à-vis previous month and previous year same period may also be recorded. If the variance is positive for sales with—for inventory and vice versa then it's appropriate else raise a concern for manual resolution The analysis according to the process 200 may be performed from different perspectives (also referred to as personas). For example, the analysis from a plan controller's perspective may include allocation of electricity costs by departments; repair costs and spare-parts consumption by department/key plant process; and labor hours by department. The analysis from a sales controller perspective may include break-down of sales by product, stock keeping unit (SKU) break-down by product or customer; analysis of customer level profitability, etc.

With reference to FIG. 2B, in some embodiments, the causal relationship algorithms may be inferred (step 232) using machine learning. Likewise, the key ratios against which violations may be tested, and the formulas for testing such violations may be derived (step 234) using machine learning. Machine learning may also be used in step 236 to identify the periodic movements to be tested and/or to determine the formulas for testing periodic movements. Alternatively, or in addition, the classification performed in step 210 can be based on machine learning. The architectures used for machine learning in one or more of steps 232, 234, 236, and 210 can be an artificial neural network (ANN), a Bayesian analysis module, a decision tree, a random forest, and/or a machine-learning-based regression module. Other architectures, such as autoencoder, recurrent neural network (RNN), support vector machine (SVM) may also be employed.

A machine learning model to be used in any of the steps 232, 234, 236, and 210 can be obtained via training as discussed above. The training begins with the creation of a training dataset and a test dataset. To create a training dataset, financial data is analyzed by humans and is labeled. This generally entails performing the action the machine learning module is expected to perform. For example, if a machine learning model is to be derived for step 231, identification of causal relationships and corresponding algorithms, humans (e.g., controllers) analyze financial data, identify causal relationships therefrom, and generate corresponding algorithms. Such labeled data is then divided into two sets, called a training dataset and a test dataset.

During the training phase, the financial data corresponding to the training dataset is supplied to a machine learning module under training, and outputs from that module are obtained. In the foregoing example, the module under training may infer some causal relationships and the associated algorithms. These outputs are compared against the labeled output and error signals for provided to the module under training, if the module outputs and labeled outputs are different. In response, the module may perform the necessary adjustments (e.g., weights and/or activation function associated with an ANN architecture) may be adjusted. The above process is repeated, and a new set of error signals is obtained, though the previous supplied inputs are supplied again, because the modules outputs may be different due to the adjustments it made. The above process is iterated for a specified number of iterations or until the numbers and/or size of the error falls below a specified threshold. At that time, the module is assumed to be trained sufficiently to move to the testing phase.

In the testing phase, a similar process as above is performed where inputs from the test dataset are provided to a module that is supposedly trained. Until this time, the module has not processed inputs corresponding to the test dataset. The module's output are compared with the labeled outputs for the test dataset. If the errors or the differences between the module outputs and labeled outputs are small in number and/or size, and fall below a specified threshold, the module is determined to be fully trained. Otherwise, the module is retrained. In some cases, more than one modules, corresponding to different architectures, may be trained for a particular step and may also be used while performing that step.

In general, the training dataset contains large volumes (e.g., hundreds, thousands, tens of thousands, etc.) of values/features/attributes of causal relationships, ratio analysis, periodic movements, correlations, and transactions, and is linked to business outcomes determined by human controllers. In other words, the dataset is labeled. This dataset is applied to a machine learning process to generate learning values also known as prediction values. In some cases, the source of training dataset may be the transactions, accounts, organization structure (such as, e.g., legal entities and business entities) of past 12 months for a legal entity. The training dataset may include transactions data and balances pertaining to the categories asset, liability, income, expense.

In some cases, a taxonomy of internal and external financial data unique to a particular industry can help the pattern identification to be accomplished using machine learning model(s). For example, in case of aviation industry, external data about the usage of engines vs their maintenance cost estimates are external and internal data, respectively. Maintenance cost of elevators and escalators also generally depend on their usage. Similarly, windmill maintenance cost is often directly related to windmill usage. As such, a combination of these external and internal data can help accelerate the pattern identification performed using a machine learning model. For example, variance in supply chain cost, e.g., in freight cost, which is internal data, may be linked to the movement in the prices of coal, diesel, and/or gasoline, which are external data. Likewise, variances in raw material cost can be impacted by commodity price movements in external markets.

Test dataset is generally a subset of the overall labeled data, where another subset if the training dataset. As such, test dataset also includes values/features/attributes of causal relationships, ratio analysis, periodic movements, correlations, and transactions, and is used to test a machine learning model trained using a training dataset, as described above. For example, it can be tested whether the machine learning model can accurately estimate seasonal changes in sales volume depending on changes in the weather.

Some embodiments also employ a prediction dataset which may include financial data across legal entities, regions, geographies, business units, etc. This dataset includes real-life data that is not pre-labeled and may be analyzed using trained and tested machine learning model(s) to predict solutions, such as to infer causal relationships, identify key ratios, generate corresponding algorithms, etc. The outcomes and the corresponding algorithms that are derived using the machine learning model(s) can be improved based from review of these outcomes and algorithms by human controllers. For instance, examples of causal relationships that are inferred and accepted (or rejected in some cases) include, audit fees and sales, inventory and sales, promotion spending and sales, sales and cost of goods sold, etc.

Model output dataset stores the outcome values from the use of various machine learning models, including, but not limited to derived algorithms, inferred correlations and causal relationships, exceptions, variances, periodic movements in various categories of financial data, key ratios, commentaries, dynamic reports, and outcome of review of such data, e.g., inferred correlation of sales spending to revenue, transactions where amounts exceed specified or derived thresholds, validation errors, transactions volatility, etc.

FIGS. 2C and 2D show example training dataset 250*a* and 250*b* for a Level 1 (L1) category assets. In the dataset 250*a* and/or 250*b*, the column "Applicable?" may be used to indicate whether a particular algorithm is relevant to and should be applied in the training of a particular AI/ML system. The column "BS/PL" indicates whether the data is relevant to the analysis of a balance sheet or the profit and loss statement. The columns L2, L3, and L4 respectively show sub-categories, sub-sub-categories, and sub-sub-sub-categories of assets. The column "Type of algorithm" indicates the nature or classification of the specified or inferred algorithms. The particular algorithms that are specified or inferred (e.g., as described with reference to FIG. 2B) and are used in analysis (e.g., as described with reference to FIG. 2A) are listed in the column "Algorithm text." A binary flag, indicating whether a threshold is applicable to a particular algorithm, is shown in column "Threshold applicable." The respective values of the respective thresholds may also be included in the dataset 250*a* and/or 250*b*, in some embodiments. Additional information useful in the overall analysis may be optionally provided in one or more additional columns, such as the column "Transaction code source."

It should be understood that FIG. 2C is illustrative only and that several additional and/or different algorithms may be specified or inferred for the category assets. Likewise, several additional and/or different sub-categories, sub-sub-categories, and sub-sub-sub-categories of assets may be included. Moreover, sub-categories, sub-sub-categories, and sub-sub-sub-categories of other categories and algorithms therefor may be included in various training datasets. Test datasets may also include similar information. Furthermore, although FIG. 2C shows the dataset 250*a* as a table, other formats, such as XML, and customized structures such as hash tables, heaps, etc., may be used to represent the training and test datasets. The choice of the format and/or structure can help minimize the memory footprint of the AL/ML based process performing the analysis.

Referring again to FIG. 1, the system 100, in general, collects data from ERP including mapping algorithms, chart of accounts, legal entity, transactions, and balances from balance sheets. It also collects data from consolidation tools including mapping algorithms, consolidated entity profit and loss (P&L) statements and balance sheets. The collected data may be validated, cleansed, aggregated, and loaded in the controllership review engine 112.

Machine learning model(s) are developed, as described above, to leverage the received data for generating insights. By applying these model(s) to the collected data, the engine 112 can first infer/define algorithms and/or formulae, that may be used for subsequent analysis of the collected data. The system 100 can thus employ causal relationship derived from balances, enabling a single view of all the business transactions impacting various balance sheet elements. Examples of such views include causal relationships between purchase, credits, and cost of goods sold; sales, inventory, and receivables; advertising spending and revenue; etc. The machine learning model(s) can also determine key financial statement ratios, typically by identifying strong correlations between various elements of the financial data. The engine can auto calculate the identified key ratios based on data obtained from financial statements and balance sheets.

Various embodiments of the engine 112 feature pattern based exception identification, to showcase policy exceptions or transactions exceeding policy control limits. Some embodiments also feature Identification of transactions volatility, to identify any abnormality. Some embodiments feature identifying, via machine learning, patterns that associate internal and external factors to financial statements, e.g., seasons and volumes of goods sold; sales and inventory and promotion spending, etc. These patterns by then be used to generate algorithms for inferring causal relationships, to identify key ratios to be observed, to identify items in which periodic movements may be observed, and/or to derive formulas for the identified key ratios and/or items to be observed for periodic movements, so as to identify exceptions and/or variances therein.

Some embodiments feature dynamic thresholds to create dynamic periodical review, such as annual, quarterly, half yearly, monthly, etc., and can identify accounts where absolute thresholds or percentage can be used for variance analysis. The above-described insights may be presented in structured templates and dynamic dashboards that can help controllers to focus on important exceptions, variances, and challenges, so that they can be analyzed thoroughly.

The use of machine learning can alleviate problems typically encountered by a computing system that may employ a conventional programming solution, such as running out of allotted processing capacity and/or time, running out of memory, excessive power consumption, etc. This is accomplished in part, by avoiding an exhaustive exploration of all the potentially feasible algorithms because the number of such algorithms can grow exponentially, and the application of all such algorithms to the financial data can become computationally prohibitive even for the largest and fastest known computing systems. Rather than performing such exhaustive exploration, the machine learning model(s) described herein learn patterns that are generally more important than others from past experience. Using these patterns, the machine learning model(s) can isolate the algorithms that are likely more relevant to a particular organization than others, where such algorithms can be applied efficiently, and without exceeding the available computing resources in terms of processing capacity (e.g., specified as million instructions per second (MIPS)); processing time, specified as actual time (in minutes, seconds, hours, etc.), and/or as CPU time (in microseconds, seconds, or minutes); and memory capacity.

Figure 3B:
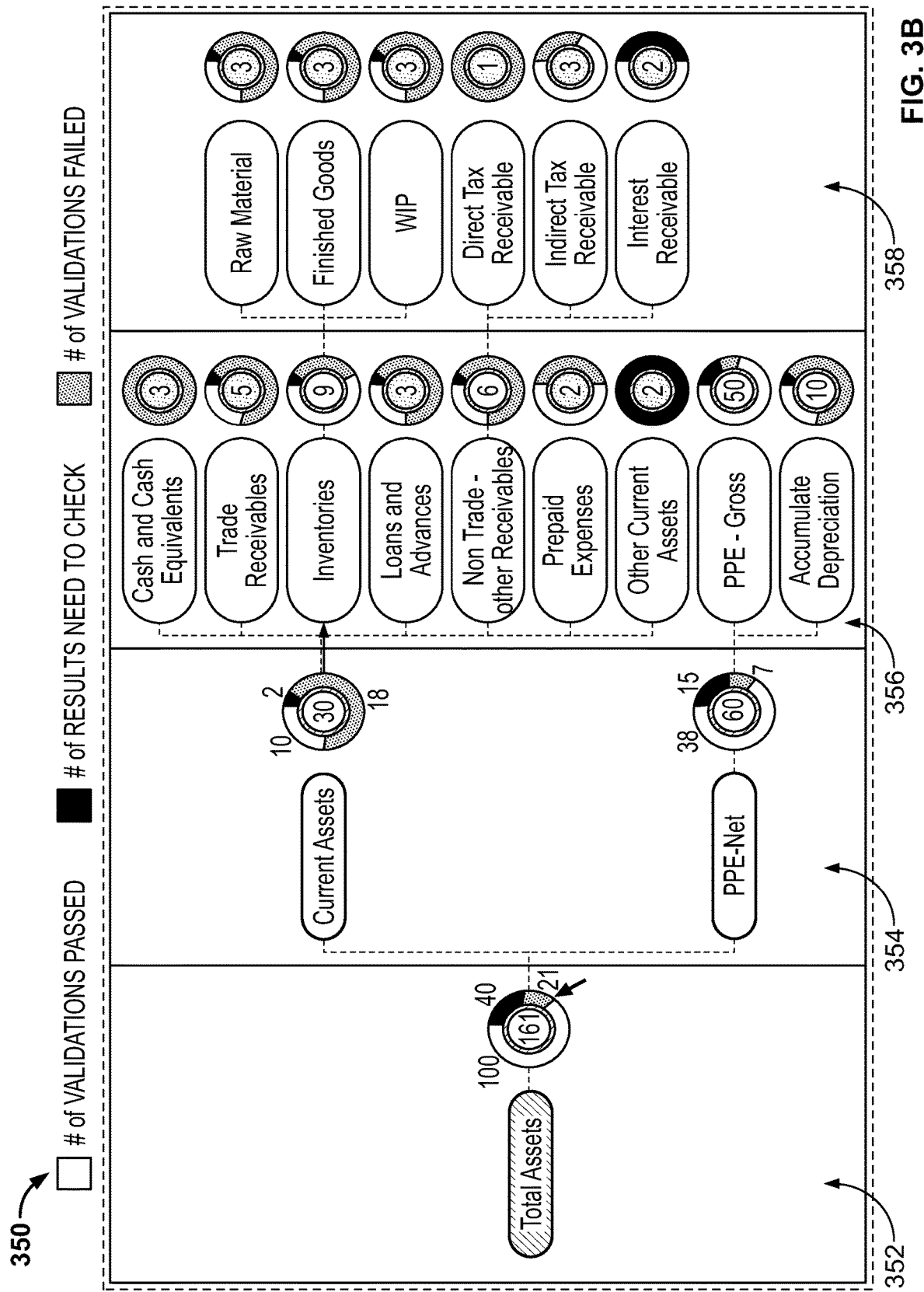

FIGS. 3A and 3B depict exemplary hierarchical dashboards presented in system 100 (FIG. 1) according to various embodiments. The dashboard 300 shown in FIG. 3A has three panels. Panel 302 shows the different categories of financial data, and the number of algorithms inferred/derived and analyzed for each category. For example, the category assets, a total 160 algorithms were applied. Panel 304 shows a breakdown of the total number of algorithms across the four dimensions of analysis, namely, causal relationships algorithms, budget vs actual algorithms, periodic movement algorithms, and key ratios algorithms. Panel 306 shows the results of classification, identified as generally proportional segments of a circle. As one example, a total of seven (7) periodic movement algorithms were applied to the category assets, as indicated by the circle 310. From these seven algorithms, four algorithms were classified as validated or passed, as indicated by the segment 312. One algorithm was classified as not validated or failed, as indicated by segment 314, and two (2) algorithms were classified as potentially not valid or failed, as indicated by segment 316.

Such results for classification are provided for all assets across all selected dimensions of analysis. This compact visual representation can quickly inform the viewer (e.g., a controller) areas that may need closer attention, allowing for efficient use of the controller time spent in reviewing the exceptions and variations. It should be understood that a circle and a segment is only one way of a compact illustration. Other forms include a simple listing of numbers in a prespecified order, e.g., "7:4 2 1," a set of squares or rectangles or proportional sizes, a pi-chart, etc.

FIG. 3B presents a hierarchical view. In particular, the dashboard 350 includes four panels, each corresponding to particular level of hierarchy, for a selected category. In one example, for the selected category "Assets," panel 352 shows that a total of 161 algorithms were applied, of which 100 algorithms were classified as valid; 21 algorithms were classified as not valid, and 40 algorithms were classified as potentially not valid. Panel 354 shows similar classification for the sub-categories "current assets" and "PPE" Panel 356 shows similar classification for the sub-subcategories, and panel 358 shows the classification for the sub-sub-categories. In the dashboard 350 also, it should be understood that a circle and a segment is only one way of a compact illustration. Other forms include a simple listing of numbers in a prespecified order, e.g., "7:4 2 1," a set of squares or rectangles or proportional sizes, a pi-chart, etc.

The dashboards 300 and 350 showcase the validation checks status, drill down of exceptions, explanation for variations beyond defined ranges, trend analysis, predictive trends for the future, work day wise variations view, and other insights for review of the financial data by controller. Such information can be provided at the country level, legal entity level, regional level, as well as at the global level. The outcome of the engine 112 (FIG. 1), in general, is to identify exceptions and/or variations in the application of the specified financial algorithms, and to notify the controller of such exceptions and/or variations before reporting, so that they can be proactively addressed. The predictive view helps in strengthening the correlations between the exceptions/variations identified by the engine 112 and those confirmed by the controllers, thereby improving the machine learning model underlying the engine 112.

FIGS. 4A and 4B depict dashboards 400 and 450 that provide further drilled-down views of the analysis described above. Specifically, dashboard 400 presents to a viewer (e.g., a controller) information for a selected category (hierarchy level L1), sub-category (hierarchy level L2), sub-subcategory (hierarchy level L3), or sub-sub-subcategory (hierarchy level L4), for a selected dimension, e.g., causal relation, key ratio, periodic movement, or budget vs actual comparison. More specifically, for the selected hierarchy level and dimension, panel 402 presents the total number of algorithms applied and the number of algorithms that failed. Panel 404 is a table in which each row corresponds to a failed algorithm. The different columns present algorithm-specific information such as type of the algorithm, associated account, name of the algorithm, and an identifier of the algorithm. In addition, the reason for which it was determined that the algorithm failed is presented in the column "validation failure message." A current status of the violation, indicating whether the violation has been corrected or not, may be presented in the "status" column. A reviewer may take actions to address or correct the violation, and may list them in a corresponding column and, accordingly may update the status of the violation of that algorithm. Dashboard 450 presents additional detailed information to the viewer.

Figures 5A, 5B:
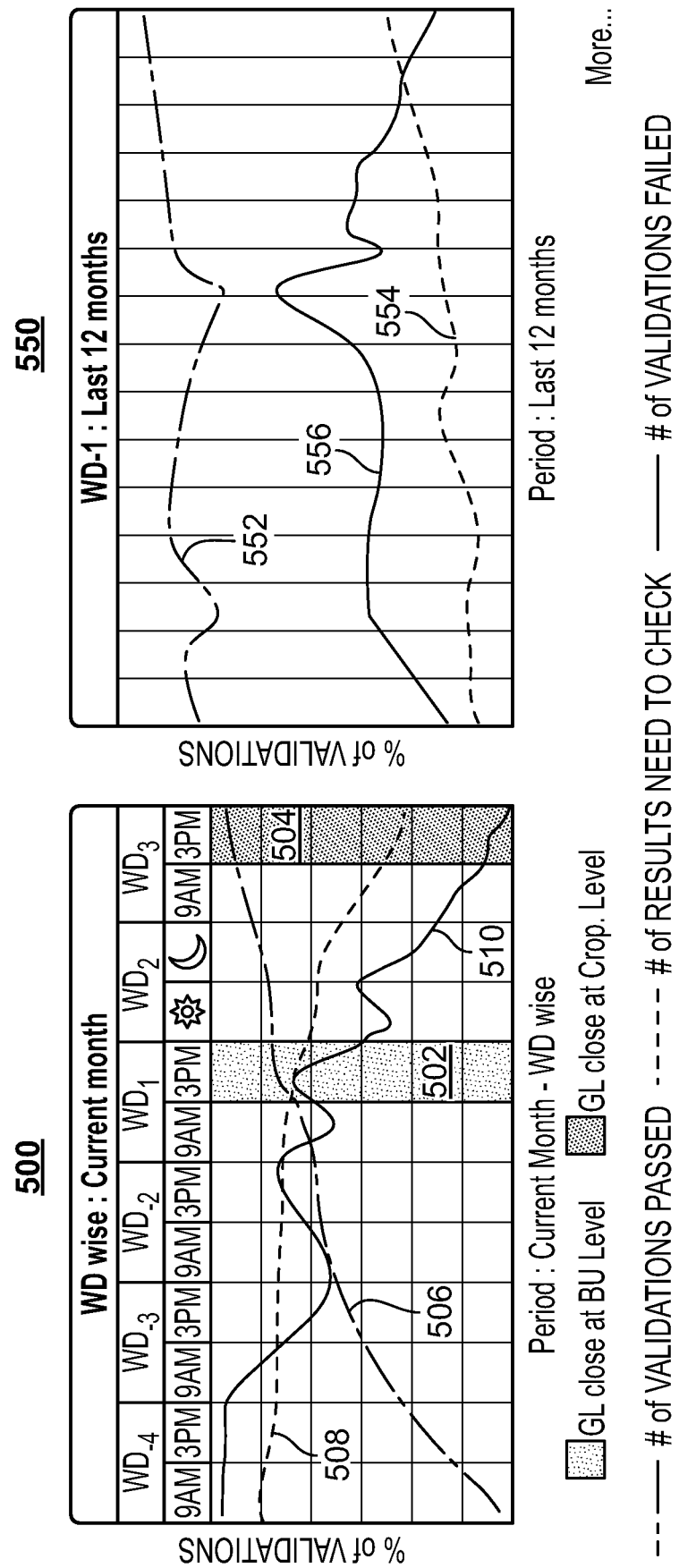
FIGS. 5A and 5B depict examples of trends in the results of analysis performed by certain embodiments of the system shown in FIG. 1.

FIGS. 5A and 5B depict examples of trends in the results of analysis performed by certain embodiments of the system shown in FIG. 1. In particular, FIG. 5A shows the trends 500 in the validation of the algorithms derived and applied by an embodiment of the system 100 (FIG. 1) on a work-day basis for the days on which a business unit closed its general ledger (GL) and a parent corporate entity closed its (GL). The work day on which the business unit closed its GL is indicated at 502 and the work day on which the corporate entity closed its GL is shown at 504. The curves 506, 508, and 510 respectively depict, on a daily basis, the number algorithms that passed, the number algorithms that were marked for follow-up review, and the number of algorithms that failed. FIG. 5B shows similar trends 550 over the past twelve months from a current date. The curves 552, 554, and 556 respectively depict, on a daily basis, the number algorithms that passed, the number algorithms that were marked for follow-up review, and the number of algorithms that failed.

Advantage of various embodiments of the system 100 (FIG. 1) include one or more of the following. Account level and transaction level insight generation driven by patterns identified via machine learning. Causal relationships insights that can be multidimensional, e.g., sales vs inventory vs marketing spend vs distribution spending. Insights generation can be on the fly vs month end wait for closing and reporting before commencing further analysis. For example, daily or intermittent updates on the analytics, based on the update of financials data, can be provided in some cases.

Persona-based analysis, customized to individual controllers/business/chief experience officer (CXO), in the required form, can be provided, with the desired level of insights. For example, plant controllers may be provided with insight on cost/product mix variance, but a sales controller may be provided with insight on products or geographies. Multiple views may be provided to different stakeholders at regional/geographical/legal entity levels Other benefits include faster and robust insights through structured analysis; identification of pattern based correlations; provisioning of transaction data driven insights, as opposed to summary level analysis; causal relationships identification, where such relationships are often latent, multi-dimensional analysis; consistent analysis of exceptions to policies; detection of and variations in key performance indicators (KPI) based on identified patterns; correlations between P&L items to balance sheet items.

Additional benefits may include account level pattern insights; patterns variation analysis at an entity level, regional level, and/or group level; scenario based impact on financial statements/commentaries; detection and identification of exceptions and variations that may require attention of the controllers, identification of important regulatory deficiencies; drill down functionality for transparency in financial reporting; improved user experience while dealing with data and generating insights; facilitation of pre-emptive controls to detect potentially fraudulent transactions; and self-service reporting via dashboards. Technical benefits include provisioning of insights by identifying latent information in data while allowing efficient usage of computing resources such as processors, memory, and storage.

Having now fully set forth the preferred embodiment and certain modifications of the concept underlying the present invention, various other embodiments as well as certain variations and modifications of the embodiments herein shown and described will occur to those skilled in the art upon becoming familiar with said underlying concept.

What is claimed is:

1. A method for anomaly detection, the method comprising:
    receiving financial data;
    applying a set of dynamic or interdependent algorithms to the received financial data to obtain a set of outcomes; and
    using a machine learning (ML) classifier to classify the outcomes as: (i) algorithm compliant, wherein classification as algorithm compliant indicates that a particular outcome resulting from application of one or more of the set of dynamic or interdependent algorithms is within norms of an organization or controller associated with the financial data, (ii) potentially algorithm non-compliant, wherein classification as potentially algorithm non-compliant indicates that a particular outcome is likely outside the norms of the organization or controller associated with the financial data, or (iii) algorithm non-compliant, wherein classification as algorithm non-compliant indicates that a particular outcome is outside the norms of the organization or controller associated with the financial data, wherein:
        the classifier is trained to perform such classification by simultaneously analyzing a plurality of outcomes resulting from application of a plurality of dynamic or interdependent algorithms from the set to financial data, and
        classification of the outcomes as potentially algorithm non-compliant or algorithm non-compliant indicates a latent anomaly in the received financial data.

2. The method of claim 1, wherein ML is used to derive one or more dynamic or interdependent algorithms.

3. The method of claim 1, wherein:
    the received financial data comprises hierarchical financial data; and
    the classifier comprises a hierarchical classifier.

4. The method of claim 3, further comprising:
    displaying the classification as a hierarchy of classifications.

5. The method of claim 1, wherein an algorithm in the set of dynamic or interdependent algorithms is based on a difference between an actual value of an item associated with the received financial data and a budgeted value for that item.

6. The method of claim 1, wherein an algorithm in the set of dynamic or interdependent algorithms is based on:
a temporal property of the received financial data;
a ratio of two items within the received financial data; or
a causal relationship between two items within the received financial data.

7. The method of claim 6, wherein:
the algorithm is derived using an ML module trained to detect periodic movement in the received data, a key ratio from the financial data, or a causal relationships between items of the financial data.

8. The method of claim 1, wherein the classifier is customized to perform the classification to mimic actions of a particular user.

9. A system for anomaly detection, the system comprising:
a processor; and
a memory in communication with the processor and comprising instructions which, when executed by the processor, program the processor to:
receive financial data;
apply a set of dynamic or interdependent algorithms to the received financial data to obtain a set of outcomes; and
operate as a machine learning (ML) classifier configured to classify the outcomes as: (i) algorithm compliant, wherein classification as algorithm compliant indicates that a particular outcome resulting from application of one or more of the set of dynamic or interdependent algorithms is within norms of an organization or controller associated with the financial data, (ii) potentially algorithm non-compliant, wherein classification as potentially algorithm non-compliant indicates that a particular outcome is likely outside the norms of the organization or controller associated with the financial data, or (iii) algorithm non-compliant, wherein classification as algorithm non-compliant indicates that a particular outcome is outside the norms of the organization or controller associated with the financial data, wherein:
the classifier is trained to perform such classification by simultaneously analyzing a plurality of outcomes resulting from application of a plurality of dynamic or interdependent algorithms from the set to financial data, and
classification of the outcomes as potentially algorithm non-compliant or algorithm non-compliant indicates a latent anomaly in the received financial data.

10. The system of claim 9, wherein ML is used to derive one or more dynamic or interdependent algorithms.

11. The system of claim 9, wherein:
the received financial data comprises hierarchical financial data; and
the classifier comprises a hierarchical classifier.

12. The system of claim 11, wherein the instructions further program the classifier to:
display the classification as a hierarchy of classifications.

13. The system of claim 9, wherein an algorithm in the set of dynamic or interdependent algorithms is based on a difference between an actual value of an item associated with the received financial data and a budgeted value for that item.

14. The system of claim 9, wherein an algorithm in the set of dynamic or interdependent algorithms is based on:
a temporal property of the received financial data;
a ratio of two items within the received financial data; or
a causal relationship between two items within the received financial data.

15. The system of claim 14, wherein:
the algorithm is derived using an ML module trained to detect periodic movement in the received data, a key ratio from the financial data, or a causal relationships between items of financial data.

16. The system of claim 9, wherein the classifier is customized to perform the classification to mimic actions of a particular user, rendering persona driven actionable triggers.

* * * * *